United States Patent
Murata

(10) Patent No.: US 10,883,855 B2
(45) Date of Patent: Jan. 5, 2021

(54) MOTOR CONTROL UNIT

(71) Applicant: DENSO CORPORATION, Kariya (JP)

(72) Inventor: Yuichiro Murata, Kariya (JP)

(73) Assignee: DENSO CORPORATION, Kariya (JP)

( * ) Notice: Subject to any disclaimer, the term of this patent is extended or adjusted under 35 U.S.C. 154(b) by 315 days.

(21) Appl. No.: 16/021,498

(22) Filed: Jun. 28, 2018

(65) Prior Publication Data
US 2019/0101413 A1 Apr. 4, 2019

(30) Foreign Application Priority Data

Oct. 4, 2017 (JP) .................. 2017-194298

(51) Int. Cl.
| H02K 5/22 | (2006.01) |
|---|---|
| G01D 5/14 | (2006.01) |
| H02K 29/08 | (2006.01) |
| G01P 3/489 | (2006.01) |
| G01P 3/487 | (2006.01) |
| H02K 11/33 | (2016.01) |
| H02K 21/16 | (2006.01) |

(Continued)

(52) U.S. Cl.
CPC ........... *G01D 5/145* (2013.01); *G01D 5/2451* (2013.01); *G01P 3/487* (2013.01); *G01P 3/489* (2013.01); *H02K 5/225* (2013.01); *H02K 11/215* (2016.01); *H02K 11/33* (2016.01); *H02K 21/16* (2013.01); *H02K 29/08* (2013.01); *G01P 3/443* (2013.01)

(58) Field of Classification Search
CPC ...... H02K 11/33; H02K 11/215; H02K 21/16; H02K 21/14; H02K 21/24; H02K 5/225; H02K 29/08; H02K 29/03; H02K 1/276; H02K 1/27; H02K 1/148; H02K 1/146; H02K 1/14; H02K 1/2773; H02K 1/278; H02K 1/08; H02K 1/17; H02K 1/24; H02K 1/06; H02K 19/04; H02K 2213/03; G01D 5/145; G01D 5/2451; G01P 3/489; G01P 3/487; G01P 3/443

See application file for complete search history.

(56) References Cited

U.S. PATENT DOCUMENTS

| 2006/0043963 A1* | 3/2006 | Kaneyasu | G01D 5/145 324/179 |
|---|---|---|---|
| 2014/0167743 A1* | 6/2014 | Park | H02K 11/22 324/207.2 |
| 2014/0176037 A1* | 6/2014 | Yoshimuta | H02P 6/16 318/632 |

FOREIGN PATENT DOCUMENTS

| EP | 1396629 A2 | 3/2004 |
|---|---|---|
| JP | 2007-252097 A | 9/2007 |

(Continued)

*Primary Examiner* — Bryan R Perez
(74) *Attorney, Agent, or Firm* — Posz Law Group, PLC

(57) ABSTRACT

A motor control unit includes a sensing unit and a driver unit. The sensing unit includes a sensor magnet to rotate in synchronization with a rotation of a rotor included in a motor, and a first sensor element and a second sensor element to convert a signal caused by a rotation of the sensor magnet into a digital signal. The driver unit controls the motor based on output signals of the elements. The sensor magnet includes a first magnetization belt and a second magnetization belt where a plurality of magnetic poles is arranged in a peripheral direction of the rotor. The belts are concentrically disposed to cause arrangements of the magnetic poles to be shifted by a predetermined angle in a peripheral direction. The elements are arranged in a radial direction of the rotor.

7 Claims, 19 Drawing Sheets

(51) Int. Cl.
   *H02K 11/215*   (2016.01)
   *G01D 5/245*   (2006.01)
   *G01P 3/44*   (2006.01)

(56) References Cited

FOREIGN PATENT DOCUMENTS

| | | |
|---|---|---|
| JP | 2008-109773 A | 5/2008 |
| JP | 2008-206354 A | 9/2008 |
| JP | 2016-220322 A | 12/2016 |

\* cited by examiner

BEFORE MAGNETIZATION

MASK

FIRST MAGNETIZATION

MASK ROTATION

MOTOR CONTROL UNIT

CROSS REFERENCE TO RELATED APPLICATION

This application is based on Japanese Patent Application No. 2017-194298 filed on Oct. 4, 2017, the disclosure of which is incorporated herein by reference.

TECHNICAL FIELD

The present disclosure relates to a motor control unit which controls a motor.

BACKGROUND

A variable valve timing control unit of an internal combustion engine includes a motor rotation angle sensor. The variable valve timing control unit calculates a rotation angle of a motor based on a sensor signal output from the motor rotation angle sensor and executes a control of the motor based on a calculation result. As the motor rotation angle sensor, a Hall element can be used.

Presently, in the above constitution, two or three sensors are used to improve a detection precision of the rotation angle. According to JP2016-220322A, the sensors are mounted to a circuit substrate while being arranged in the vicinity of a rotor of the motor to cause the sensors to be different from each other by 120 degrees in electric angles.

SUMMARY

In a conventional constitution as the above, spaces between the sensors become dead spaces where other circuit elements cannot be assembled, occupation areas of installation parts of the sensors relative to the circuit substrate are large. As a result, in the conventional constitution, it is difficult to miniaturize the above unit.

It is an object of the present disclosure to provide a motor control unit which can appropriately maintain a detection precision of a rotation angle of a motor and can suppress an occupation area of an installation part of a sensor relative to a circuit substrate to be small.

According to a first aspect of the present disclosure, the motor control unit that controls a motor includes a sensing unit and a driver unit. The sensing unit includes a sensor magnet configured to rotate in synchronization with a rotation of a rotor included in the motor, and a first sensor element and a second sensor element configured to convert a periodical magnetic signal caused by a rotation of the sensor magnet into a digital signal. The driver unit is configured to control the motor based on output signals of the first sensor element and the second sensor element.

The sensor magnet includes a first magnetization belt and a second magnetization belt where a plurality of magnetic poles is arranged in a peripheral direction of the rotor, and the first magnetization belt and the second magnetization belt are a ring shape. The first magnetization belt and the second magnetization belt are concentrically disposed to cause arrangements of the magnetic poles to be shifted from each other by a predetermined angle in a peripheral direction of the first magnetization belt or the second magnetization belt. The first sensor element and the second sensor element are arranged in a radial direction of the rotor.

According to the above configuration, since the first sensor element and the second sensor element are different from each other by the electric angle that is 120 degrees, it is unnecessary to arrange the first sensor element and the second sensor element to be separated from each other. Thus, the first sensor element and the second sensor element can be arranged to approach each other, and a dead space between the first sensor element and the second sensor element can be suppressed to have a small area. In this case, since the above configuration is applied to the sensor magnet, a detection precision of the rotation angle of the motor is as the same level as a conventional configuration. Thus, an occupation area of an installation part of the first sensor element and the second sensor element relative to the circuit substrate can be suppressed to be small, while the detection precision of the rotation angle of the motor can be maintained appropriately.

According to a second aspect of the present disclosure, in the motor control unit, the first sensor element and the second sensor element are constituted by a semiconductor integrated circuit housed in a single package. According to the above configuration, an occupation area of an installation part of the sensor relative to the circuit substrate can be suppressed to be further small. In a conventional configuration, when a position deviation between sensors occurs, a detection precision of a rotation angle decreases. Thus, it is necessary to manage a precision of the position deviation, and it may occur that a workload of a manufacturing or a cost of the manufacturing increases. When the first sensor element and the second sensor element are assembled in one chip, it is unlikely that the position deviation caused by a variation of the arrangement of the first sensor element and the second sensor element occurs. Thus, according to the above description, a diagnosis process to manage a precision of a position deviation between the first sensor element and the second sensor element can be canceled, and an increasing of a workload of a manufacturing or an increasing of a cost of the manufacturing can be suppressed.

BRIEF DESCRIPTION OF THE DRAWINGS

The above and other objects, features and advantages of the present disclosure will become more apparent from the following detailed description made with reference to the accompanying drawings. In the drawings.

DESCRIPTION OF EMBODIMENTS

Figure 1:
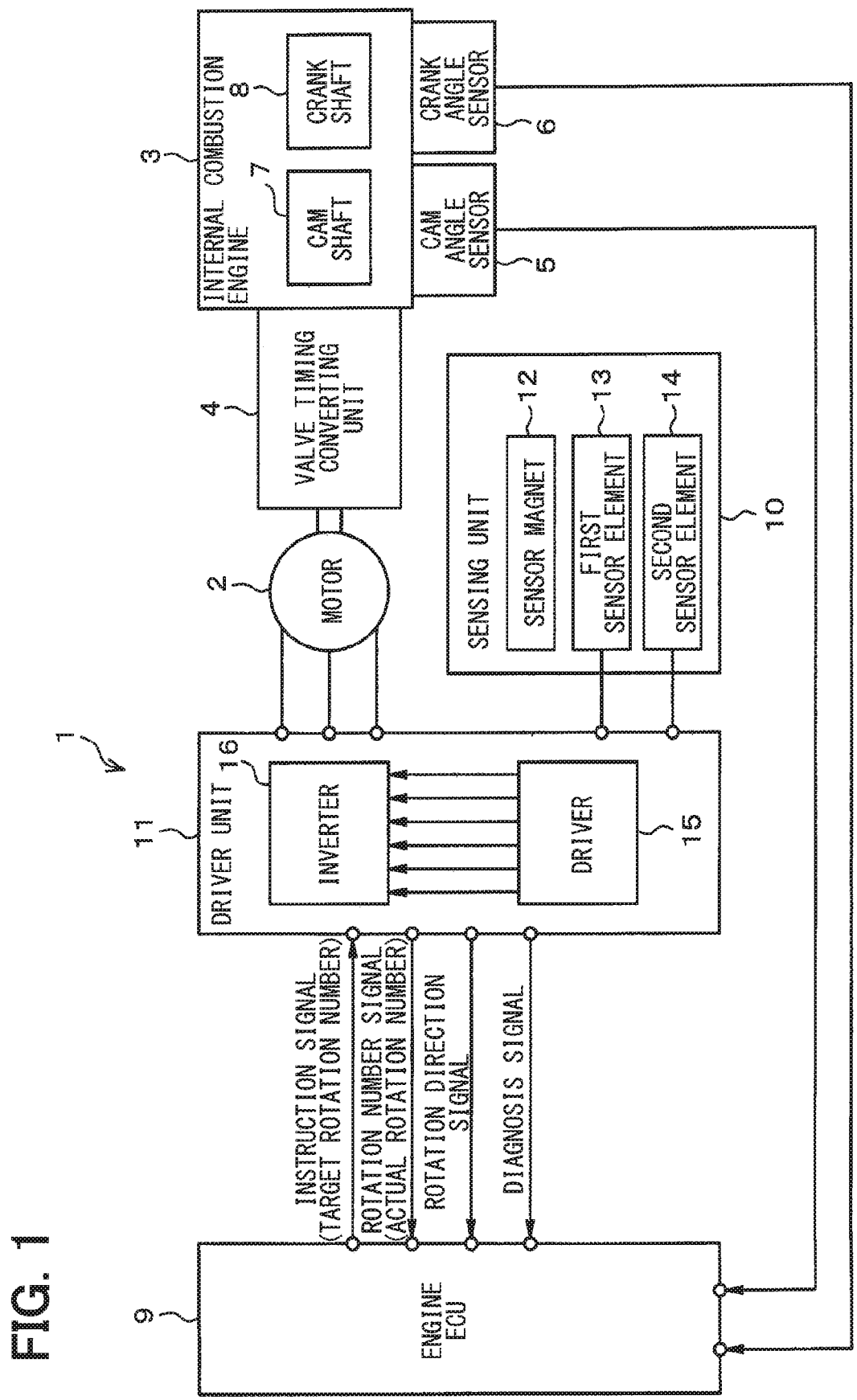
FIG. 1 is a schematic diagram showing a configuration of a motor control unit, according to a first embodiment of the present disclosure.

Hereafter, referring to drawings, embodiments of the present disclosure will be described. The substantially same parts or components as those in the embodiments are indicated with the same reference numerals and the same descriptions may be omitted.

First Embodiment

Hereafter, a first embodiment of the present disclosure will be described referring to FIGS. 1 to 14.

As shown in FIG. 1, a motor control unit 1 drives a motor 2 that is mounted to a vehicle. FIG. 1 further shows an internal combustion engine 3, a valve timing converting unit 4, a cam angle sensor 5 and a crank angle sensor 6, in addition of the motor control unit 1 and the motor 2.

The motor control unit 1 controls a rotation of the motor 2 to control a phase difference between a cam shaft 7 of the internal combustion engine 3 and a crank shaft 8 of the internal combustion engine 3. The motor 2 is mechanically connected with the internal combustion engine 3 via the valve timing converting unit 4. According to the present embodiment, the motor 2 is a synchronous motor including a permanent magnet. The motor 2 is of an inner rotor type and includes a rotor and a stator around the rotor.

The motor control unit 1 includes an engine ECU 9, a sensing unit 10 and a driver unit 11. The engine ECU 9 outputs an instruction signal including a target rotation number of the motor 2 to the driver unit 11. The engine ECU 9 receives detection signals output from the cam angle sensor 5 that detects a rotation angle of the cam shaft 7 and the crank angle sensor 6 that detects a rotation angle of the crank shaft 8. The driver unit 11 outputs a rotation number signal including an actual rotation number of the motor 2, a rotation direction signal including a rotation direction of the motor 2 and a diagnosis signal including a diagnosis result of the driver unit 11, to the engine ECU 9.

The engine ECU 9 sets the target rotation number of the motor 2, based on various sensor signals indicating a travel state of the vehicle, the rotation number of the internal combustion engine 3 and the rotation number signal output from the driver unit 11. As the various sensor signals, for example, sensor signals output by an accelerator opening degree sensor that indicates an accelerator pressing quantity of a user and by an air flow meter that measures an intake air quantity of the internal combustion engine 3 can be taken.

The sensing unit 10 includes a sensor magnet 12 that rotates in synchronization with a rotation of the rotor included in the motor 2, and a first sensor element 13 and a second sensor element 14 that convert a periodical magnetic signal caused by a rotation of the sensor magnet 12 into a digital signal. Output signals (digital signals) of the first sensor element 13 and the second sensor element 14 are equivalent to the sensor signal corresponding to a rotation angle of the motor 2, and are transmitted to the driver unit 11.

The driver unit 11 includes a driver 15, and an inverter 16 where six switching elements are connected in a three-phase full bridge circuit. The driver 15 controls an operation of the inverter 16 based on the instruction signal received from the engine ECU 9 and the sensor signal received from the sensing unit 10, to control a drive of the motor 2.

Figure 2:
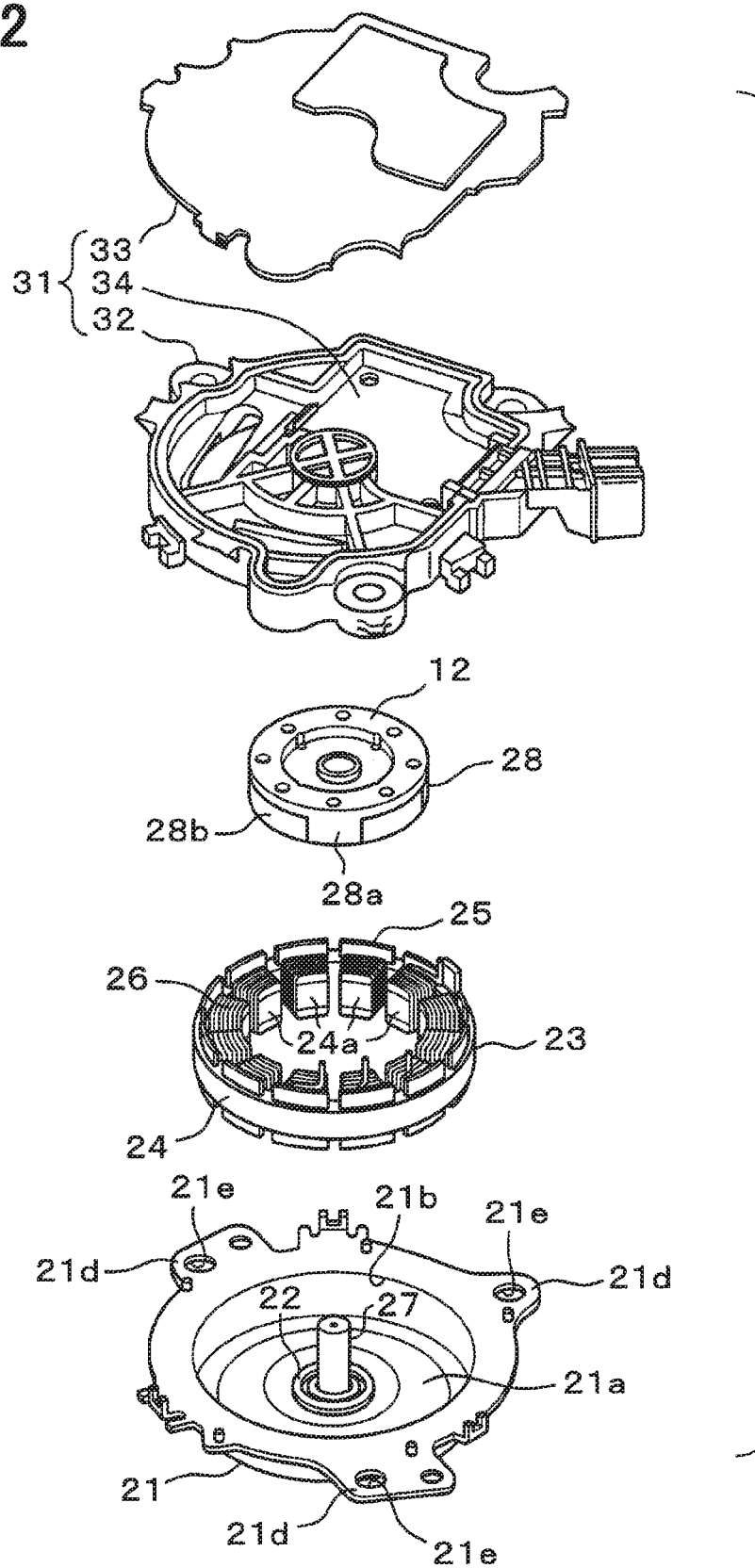
FIG. 2 is a schematic diagram showing a specific constitution of a motor, according to the first embodiment.

As a specific constitution of the motor 2, a constitution shown in FIG. 2 may be used. Since the sensor magnet 12 of the sensing unit 10 is disposed in the motor 2, constitution components of the motor 2 and the sensor magnet 12 are shown in FIG. 2.

In the constitution shown in FIG. 2, a yoke housing 21 is a bottomed cylindrical shape. According to the present embodiment, the yoke housing 21 is referred to as a yoke 21. The yoke 21 includes a bottom part 21a. The bottom part 21a includes a center part in a radial direction of the bottom part 21a. A bearing receiving unit that is not shown and is a cylindrical shape is located at the center part and extends toward an exterior of the yoke 21 in an axial direction of the yoke 21. The bearing receiving unit receives a bearing 22 that is a ball bearing and is a circular shape.

The yoke 21 includes an opening part 21b. A flange part 21c that is a flanged shape and extends outward of a radial direction of the yoke 21 is located at the opening part 21b. Yoke attachment parts 21d that protrude outward of the radial direction at plural positions in a peripheral direction is located at the flange part 21c. According to the present embodiment, the yoke attachment parts 21d protrude at three positions. The yoke attachment parts 21d fix the motor 2 to an exterior position that is an attachment position of the motor 2 in the vehicle. Each of the yoke attachment parts 21d includes an attachment hole 21e through which a screw that is not shown for fixing is inserted.

A stator 23 that is a cylindrical shape is fixed at an inner peripheral surface of the yoke 21. The stator 23 includes a stator core 24 that includes teeth 24a extending in the radial direction, and a wiring 26 that is wound to the teeth 24a through an insulator 25. According to the present embodiment, the stator core 24 includes twelve teeth 24a. A shaft 27 that is a columnar shape is rotatably supported in the stator 23. The shaft 27 is located at a center part of the yoke 21 in the radial direction of the yoke 21. The shaft 27 includes a tip end part that is rotatably supported by the bearing 22.

A rotor 28 that is a disc shape is outwardly fitted and fixed to the shaft 27, and the rotor 28 is rotatable integrally with the shaft 27. The rotor 28 fixed to the shaft 27 is opposite to the stator 23 in a radial direction of the rotor 28. The rotor 28 includes a rotor core 28a that is outwardly fitted and fixed to the shaft 27 and is rotatable integrally with the shaft 27, and a permanent magnet 28b that is supported by the rotor core 28a. The rotor 28 includes a surface facing a circuit unit 31. The sensor magnet 12 is attached to the surface by a bonding. The sensor magnet 12 generates a magnetic force in an axial direction that is perpendicular to a radial direction of the sensor magnet 12 and is perpendicular to a peripheral direction of the sensor magnet 12. According to the present embodiment, the axial direction is referred to as a Z-axis direction.

The circuit unit 31 includes a base component 32 that blocks the opening part 21b of the yoke 21, a cover component 33 that is fixed to the base component 32, and a circuit substrate 34 that is disposed at the base component 32. The circuit substrate 34 includes a surface facing the rotor 28. Circuit elements including the first sensor element 13 and the second sensor element 14 are mounted to the surface. The first sensor element 13 and the second sensor element 14 are located to be opposite to the sensor magnet 12, to cause the first sensor element 13 and the second sensor element 14 to receive the magnetic force generated by the sensor magnet 12 in the Z-axis direction.

Figure 3:
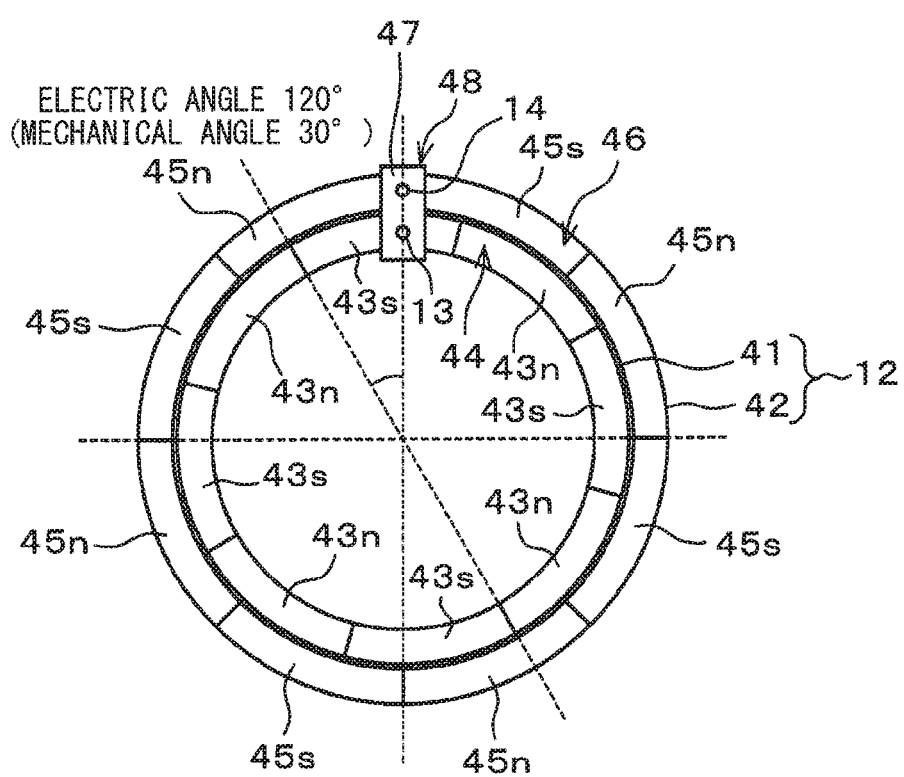
FIG. 3 is a schematic diagram showing a specific constitution of a sensing unit, according to the first embodiment.

As a specific constitution of the sensing unit 10, a constitution shown in FIG. 3 can be used. According to the constitution shown in FIG. 3, the sensor magnet 12 includes a first ring 41 and a second ring 42 which are concentrically disposed. In this case, the first ring 41 is disposed inwardly in the radial direction of the sensor magnet 12 relative to the second ring 42, and the second ring 42 is disposed outwardly in the radial direction of the sensor magnet 12 relative to the first ring 41. The first ring 41 and the second ring 42 are fixed to each other by a bonding.

A first magnetization belt 44 that is a ring shape is located at the first ring 41. The first magnetization belt 44 is constituted by magnetic poles 43n, 43s which are alternatively arranged in a peripheral direction of the rotor 28. A second magnetization belt 46 that is a ring shape is located at the second ring 42. The second magnetization belt 46 is constituted by magnetic poles 45n, 45s which are alternatively arranged in the peripheral direction of the rotor 28.

The magnetic poles 43n, 45n are N-poles, and the magnetic poles 43s, 45s are S-poles. Hereafter, when it is unnecessary to mention a polarity of a magnetic pole, the magnetic poles 43n, 43s are referred to as magnetic poles 43, and the magnetic poles 45n, 45s are referred to as magnetic poles 45.

According to the present embodiment, a total number of the magnetic poles 43 of the first magnetization belt 44 and a total number of the magnetic poles 45 of the second magnetization belt 46 are eight. The first magnetization belt 44 and the second magnetization belt 46 are concentrically disposed to cause arrangements of the magnetic poles 43, 45 to be shifted from each other by a predetermined angle in a peripheral direction of the first magnetization belt 44 or the second magnetization belt 46. According to the present embodiment, the predetermined angle is 120 degrees that is an electric angle, and is 30 degrees that is a mechanical angle.

The first sensor element 13 and the second sensor element 14 are arranged in the radial direction of the rotor 28. The first sensor element 13 and the second sensor element 14 are Hall elements and are constituted by a semiconductor integrated circuit 48 housed in a single package 47. Hereafter, the semiconductor integrated circuit 48 is referred to as a sensor IC 48.

Figure 4:
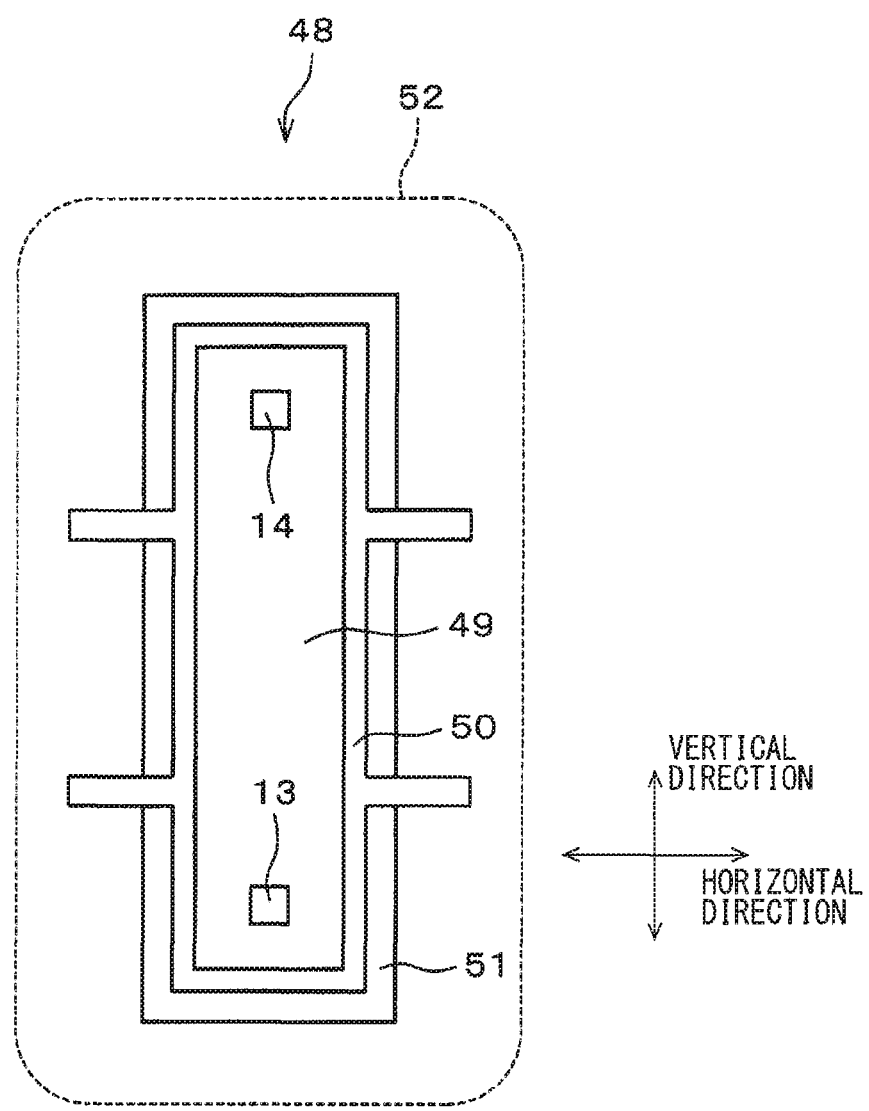
FIG. 4 is a schematic diagram showing a specific constitution of a sensor IC, according to the first embodiment.

As a specific constitution of the sensor IC 48, a constitution shown in FIG. 4 can be used. As shown in FIG. 4, the sensor IC 48 includes a sensor chip 49 on which the first sensor element 13 and the second sensor element 14 are mounted, a lead frame 50 that supports the sensor chip 49 and is connected with an external wiring, and a resin mold 51 that seals the sensor chip 49.

According to the constitution shown in FIG. 4, the first sensor element 13 and the second sensor element 14 have a dimension in a horizontal direction that is 0.3 mm and a dimension in a vertical direction that is 0.3 mm. The sensor chip 49 has a dimension in the horizontal direction that is 1 mm and a dimension in the vertical direction that is 5 mm. The lead frame 50 has a dimension in the horizontal direction that is 1.4 mm and a dimension in the vertical direction that is 5.4 mm. The resin mold 51 has a dimension in the horizontal direction that is 2.4 mm and a dimension in the vertical direction that is 6.4 mm.

When the sensor IC 48 is mounted to the circuit substrate 34, the circuit substrate 34 includes a substrate exclusive-possession part 52 where the sensor IC 48 is located. The substrate exclusive-possession part 52 has a dimension in the horizontal direction that is 5.4 mm and a dimension in the vertical direction that is 9.4 mm. The substrate exclusive-possession part 52 is equivalent to a region where the sensor IC 48 is located. Thus, an area of the substrate exclusive-possession part 52 of the sensor IC 48 is 50.76 mm$^2$.

Figure 5:
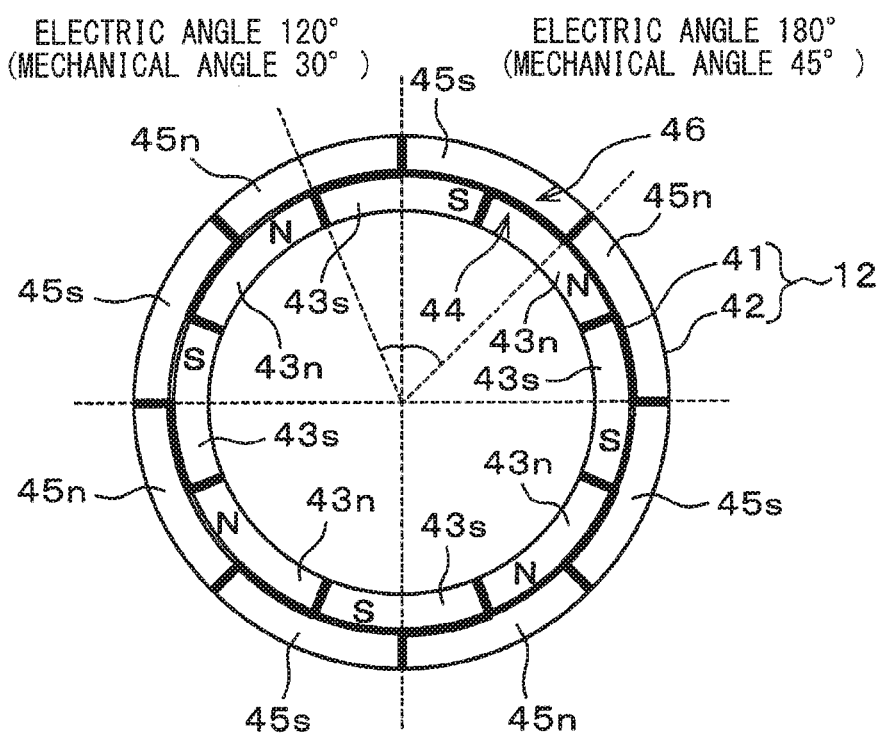
FIG. 5 is a diagram showing a position where a magnetic force in a Z-axis direction is less than the magnetic forces at other positions in a sensor magnet, according to the first embodiment.

As shown in FIG. 5, in the sensor magnet 12, the magnetic forces in the Z-axis direction at positions where S-poles and N-poles are adjacent to each other are less than the magnetic forces in the X-axis direction at positions other than the positions where S-poles and N-poles are adjacent to each other. The positions where S-poles and N-poles are adjacent to each other are indicated by thick solid lines shown in FIG. 5. According to the present embodiment by considering the above matter, an arrangement of the sensor IC 48 is set, that is, an arrangement of the first sensor element 13 and the second sensor element 14 is set.

Figure 6:
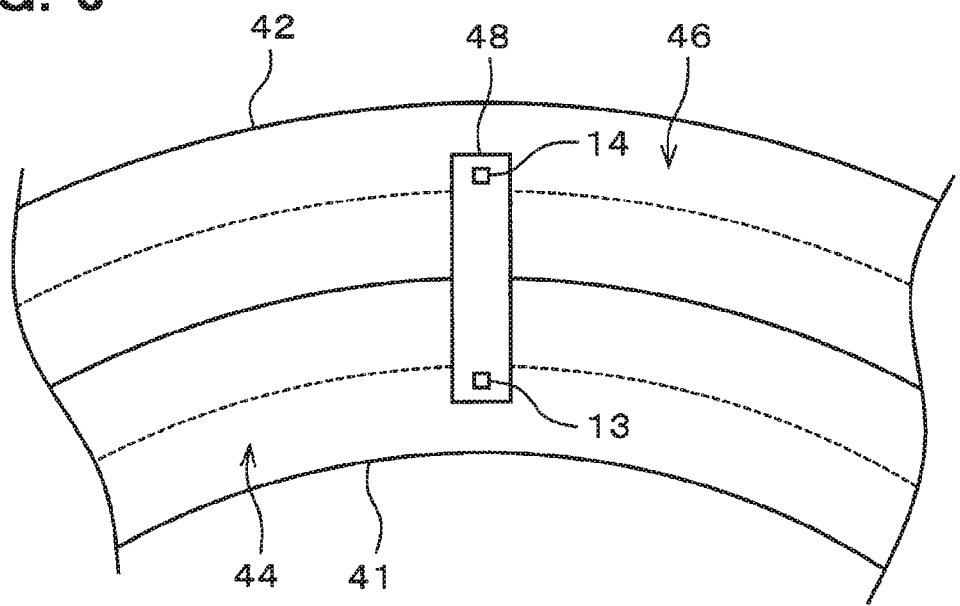
FIG. 6 is a diagram showing a specific arrangement position of the sensor IC, according to the first embodiment.

Specifically, the sensor IC 48 is arranged as shown in FIG. 6. The first sensor element 13 is located at a position to face the first magnetization belt 44 and is located outward of a center of the first magnetization belt 44 in a radial direction of the first magnetization belt 44 and is located inward of the center of the first magnetization belt 44 in a radial direction of the first ring 41. The second sensor element 14 is located at a position to face the second magnetization belt 46 and is located outward of a center of the second magnetization belt 46 in a radial direction of the second magnetization belt 46 and is located outward of the center of the second magnetization belt 46 in a radial direction of the second ring 42.

Figure 7:
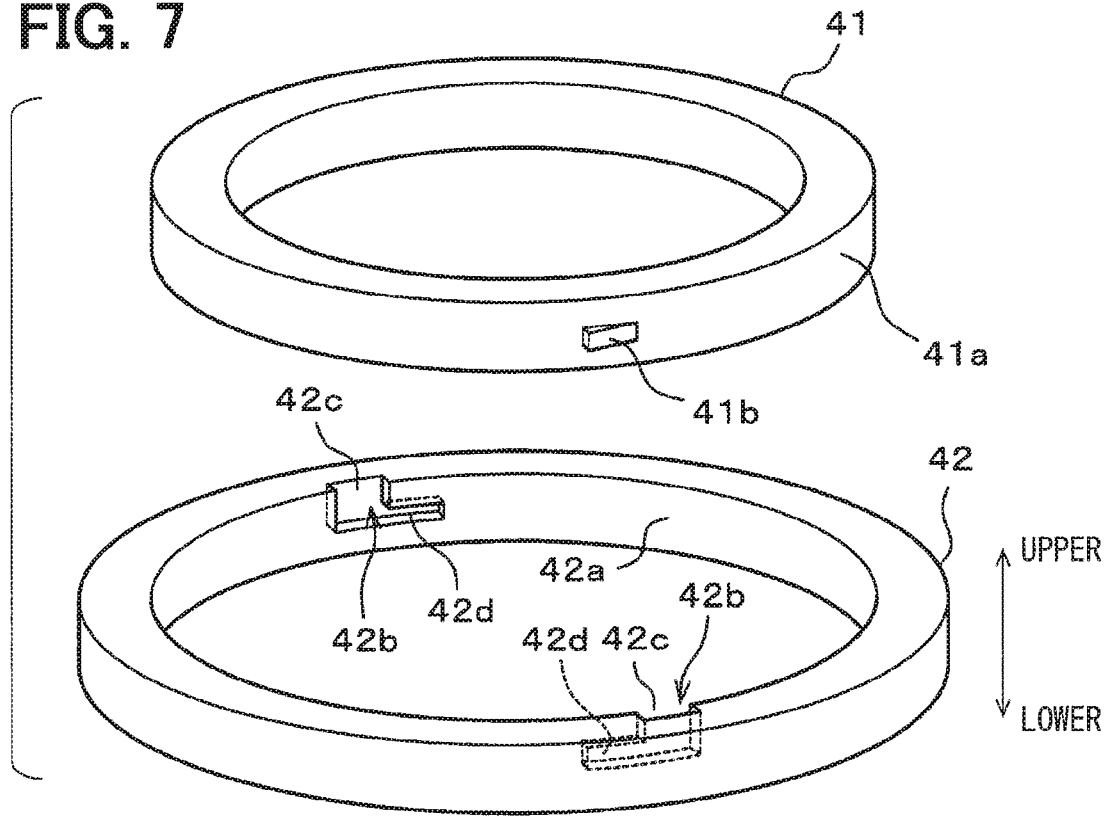
FIG. 7 is a schematic diagram showing a specific constitution of two rings, according to the first embodiment.

As a specific constitution of the first ring 41 and the second ring 42, a constitution shown in FIG. 7 can be used. According to the constitution shown in FIG. 7, the first ring 41 includes a side surface part 41a and two protrusion parts 41b. The side surface part 41a is in contact with the second ring 42 at an outer periphery of the first ring 41 in the radial direction of the first ring 41. The protrusion parts 41b outwardly protrude from the side surface part 41a in the radial direction of the first ring 41. The protrusion parts 41b are located to be opposite to each other in the radial direction of the first ring 41.

The second ring 42 includes a side surface part 42a and two recession parts 42b. The side surface part 42a is in contact with the first ring 41 at an inner periphery of the second ring 42 in the radial direction of the second ring 42. The recession parts 42b inwardly recess from the side surface part 42a in the radial direction of the second ring 42. The recession parts 42b are located to be opposite to each other in the radial direction of the second ring 42. The recession parts 42b have shapes into which the protrusion parts 41b can be inserted.

In this case, each of the recession parts 42b includes an insertion part 42c and a fixing part 42d that is located at a position lower than the insertion part 42c in an axial direction of the second ring 42. The insertion part 42c extends from the fixing part 42d to an upper surface of the second ring 42 in the axial direction of the second ring 42. The fixing part 42d extends from the insertion part 42c in a peripheral direction of the second ring 42. Thus, a length of a lower part of each of the recession parts 42b in the axial direction of the second ring 42 is longer than a length of each of the protrusion parts 41b, in the peripheral direction of the second ring 42. In this case, the lower part is equivalent to the fixing part 42d.

Figure 8:
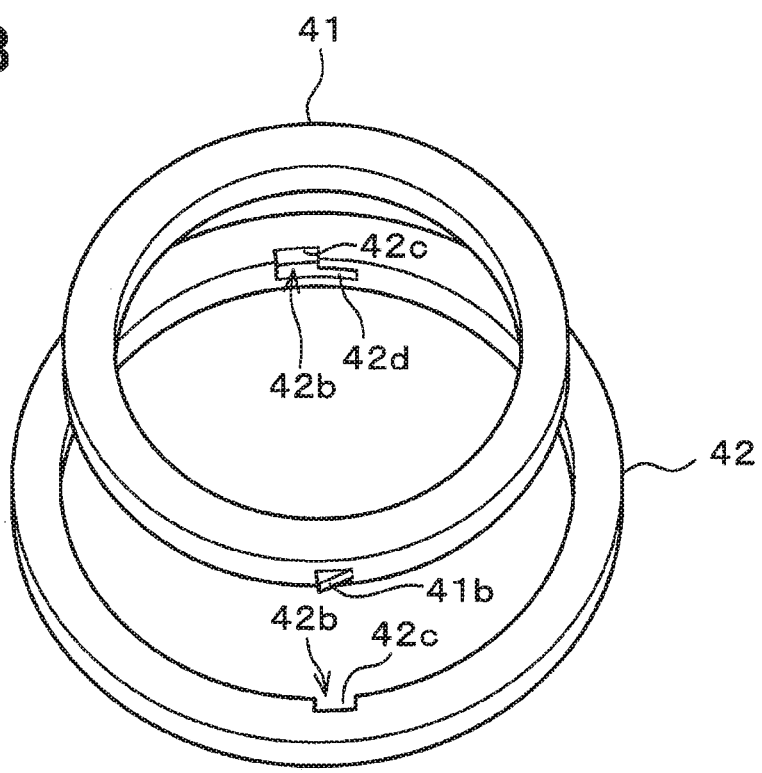
FIG. 8 is a schematic diagram showing the specific constitution of the two rings, according to the first embodiment.
Figure 9:
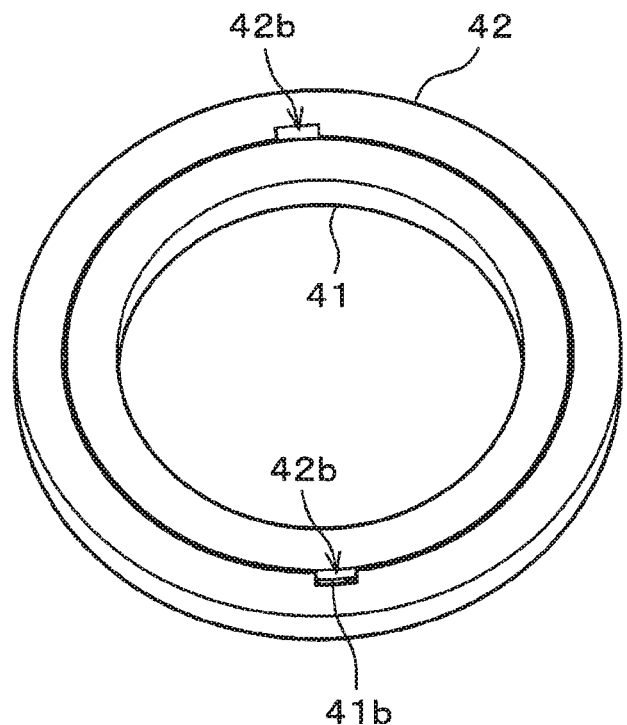
FIG. 9 is a schematic diagram showing the specific constitution of the two rings, according to the first embodiment.
Figure 10:
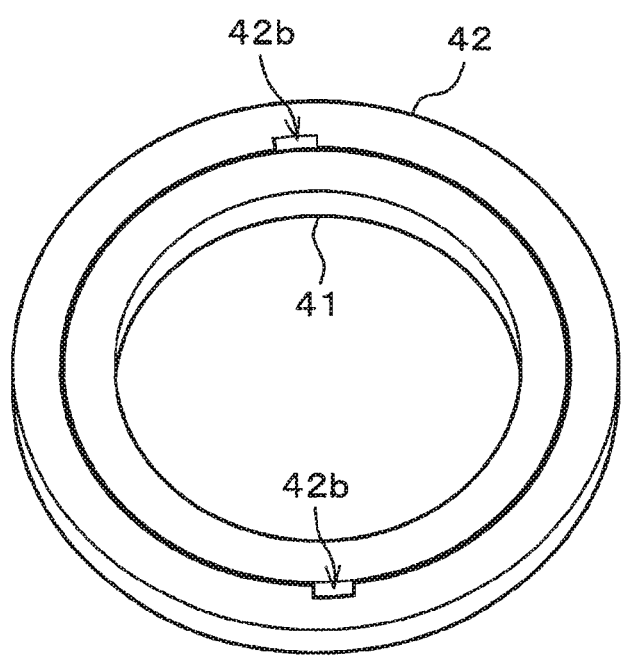
FIG. 10 is a schematic diagram showing the specific constitution of the two rings, according to the first embodiment.

When the recession parts 42b are inserted into the protrusion parts 41b, the first ring 41 and the second ring 42 are assembled to each other, and the first magnetization belt 44 and the second magnetization belt 46 are concentrically disposed. Specifically, as shown in FIGS. 8 and 9, firstly, the protrusion parts 41b are inserted into the insertion parts 42c of the recession parts 42b. Then, the protrusion parts 41b are moved toward the fixing parts 42d of the recession parts 42b, and the first ring 41 and the second ring 42 are rotated relative to each other in the peripheral direction. Then, as shown in FIG. 10, the first ring 41 and the second ring 42 are completely assembled.

Figure 11:
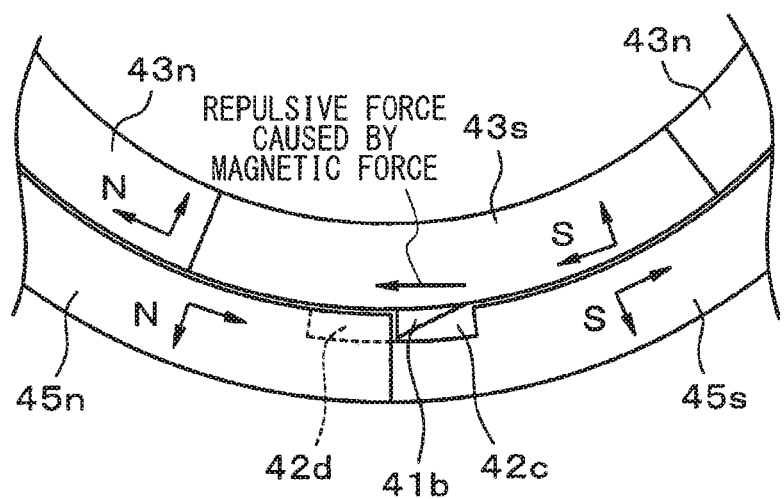
FIG. 11 is a diagram showing an operation caused by the magnetic force when the two rings are assembled, according to the first embodiment.

In this case, the recession parts 42b and the protrusion parts 41b are arranged to cause the first ring 41 and the second ring 42 to be rotated relative to each other by a magnetic force caused at magnetic poles 43, 45 of the first magnetization belt 44 and the second magnetization belt 46 when the protrusion parts 41b are inserted into the recession parts 42b. Specifically, as shown in FIG. 11, in a state where the protrusion parts 41b of the first ring 41 is located at the insertion parts 42c of the second ring 42, the arrangements of the magnetic poles 43 and 45 are shifted from each other by an angle greater than the predetermined angle.

Figure 12:
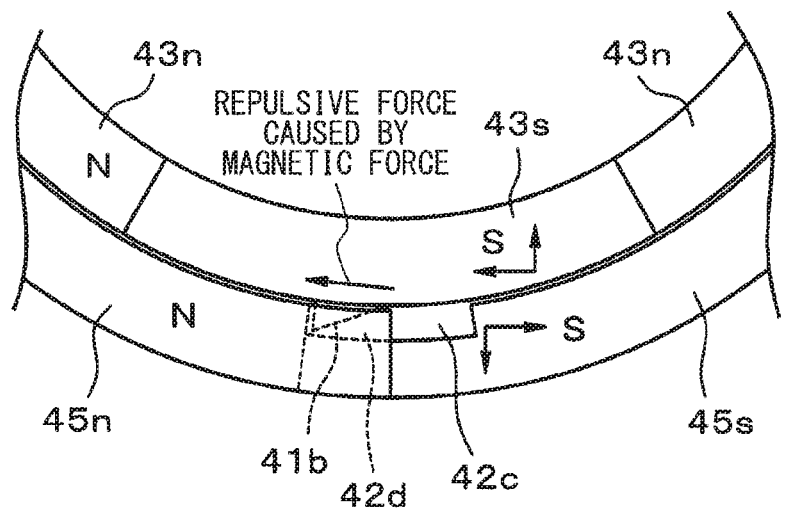
FIG. 12 is a diagram showing the operation caused by the magnetic force when the two rings are assembled, according to the first embodiment.

Thus, a repulsive force caused by the magnetic force applied to the magnetic poles 43, 45 causes the protrusion parts 41b to move toward the fixing part 42d, and the first ring 41 and the second ring 42 are rotated relative to each other. As shown in FIG. 12, when the protrusion parts 41b becomes in contact with the fixing parts 42d, positions of the first ring 41 and the second ring 42 in the peripheral direction are fixed.

Figure 13:
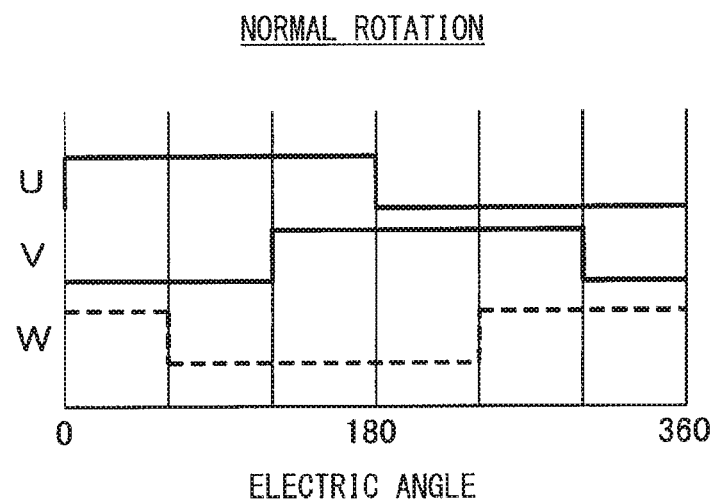
FIG. 13 is a schematic diagram showing a sensor signal in a normal rotation, according to the first embodiment.
Figure 14:
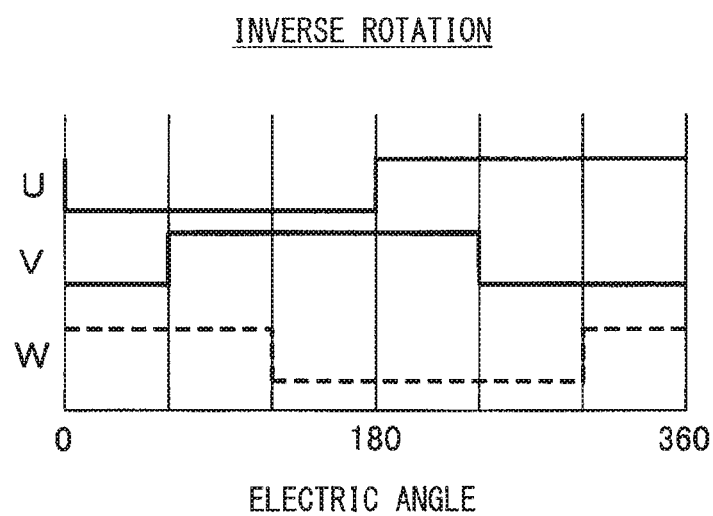
FIG. 14 is a schematic diagram showing the sensor signal in an inverse rotation, according to the first embodiment.

According to the above description, as shown in FIGS. 13 and 14, the sensor signals output from the first sensor element 13 and the second sensor element 14 are the same as signals in a conventional configuration (for example, a configuration in JP2016-220322A) where two sensor elements are different from each other by an electric angle that is 120 degrees. FIG. 13 shows the sensor signals in a normal rotation where the motor 2 rotates in a first direction, and FIG. 14 shows the sensors signals in an inverse rotation where the motor 2 rotates in a second direction that is opposite to the first direction. As shown in FIGS. 13 and 14, solid lines indicate the sensor signals output from the first sensor element 13 and the second sensor element 14.

Thus, a technology in JP2016-220322A can be applied to the above configuration. In this case, the driver unit 11 may measure a time where a level of an output signal of the first sensor element 13 and a level of an output signal of the second sensor element 14 are identical to each other, and may estimate the rotation angle of the motor 2 based on the measured time, the level of the output signal of the first sensor element 13 and the level of the output signal of the second sensor element 14. Thus, even though the rotation angle of the motor 2 is detected by using two sensor elements that are the first sensor element 13 and the second sensor element 14, the rotation angle of the motor 2 can be detected with a high precision.

According to the present embodiment, in the motor control unit 1, the sensor magnet 12 includes the first magnetization belt 44 and the second magnetization belt 46 that are ring shape and are constituted by eight magnetic poles 43 and eight magnetic poles 45 arranged in the peripheral direction of the rotor 28. The first magnetization belt 44 and the second magnetization belt 46 are concentrically disposed to cause the arrangements of the magnetic poles 43, 45 to be shifted from each other by the predetermined angle in the peripheral direction of the first magnetization belt 44 or the second magnetization belt 46. The first sensor element 13 and the second sensor element 14 are arranged in the radial direction of the rotor 28.

According to the above configuration, since the first sensor element 13 and the second sensor element 14 are different from each other by the electric angle that is 120 degrees as a conventional configuration, it is unnecessary to arrange the first sensor element 13 and the second sensor element 14 to be separated from each other. Thus, the first sensor element 13 and the second sensor element 14 can be arranged to approach each other, and a dead space between the first sensor element 13 and the second sensor element 14 can be suppressed to have a small area. In this case, since the above configuration is applied to the sensor magnet 12, a detection precision of the rotation angle of the motor 2 is as the same level as a conventional configuration. Thus, an occupation area of an installation part of the first sensor element 13 and the second sensor element 14 relative to the circuit substrate 34 can be suppressed to be small, while the detection precision of the rotation angle of the motor 2 can be maintained appropriately.

In the motor control unit 1, the first sensor element 13 and the second sensor element 14 are constituted by the sensor IC 48 housed in the single package 47. According to the above configuration, an occupation area of an installation part of the sensor IC 48 relative to the circuit substrate 34 can be suppressed to be further small.

In a conventional configuration, when a position deviation between sensors occurs, a detection precision of a rotation angle decreases. Thus, it is necessary to manage a precision of the position deviation, and it may occur that a workload of a manufacturing or a cost of the manufacturing increases. When the first sensor element 13 and the second sensor element 14 are assembled in one chip, it is unlikely that the position deviation caused by a variation of the arrangement of the first sensor element 13 and the second sensor element 14 occurs. Thus, according to the above description, a diagnosis process to manage a precision of a position deviation between the first sensor element 13 and the second sensor element 14 can be canceled, and an increasing of a workload of a manufacturing or an increasing of a cost of the manufacturing can be suppressed.

It is preferable that a chip size is decreased as small as possible to decrease a substrate exclusive-possession area of the sensor IC 48. When the chip size is excessively decreased, it is possible that the first sensor element 13 and the second sensor element 14 are arranged at positions of the sensor magnet 12 where the magnetic force in the Z-axis direction is relatively small to be opposite to each other. Thus, it is possible that an erroneous detection of the rotation angle of the motor 2 occurs.

According to the present embodiment, the first sensor element 13 is located at a position to face the first magnetization belt 44 and is located inward of the center of the first magnetization belt 44 in the radial direction of the first magnetization belt 44. The second sensor element 14 is located at a position to face the second magnetization belt 46 and is located outward of the center of the second magnetization belt 46 in the radial direction of the second magnetization belt 46. Thus, it is prevented that the first sensor element 13 and the second sensor element 14 are arranged at positions of the sensor magnet 12 where the magnetic force in the Z-axis direction is relatively small to be opposite to each other. Then, an occurrence of the erroneous detection of the rotation angle of the motor 2 can be prevented.

According to the present embodiment, the sensor magnet 12 is constituted by the first ring 41 and the second ring 42. In this case, when the first ring 41 and the second ring 42 are assembled, positions where magnetic poles 43, 45 having the same polarity are adjacent to each other exist. Thus, it is possible that positions of the first ring 41 and the second ring 42 are unstable due to the repulsive force caused by the magnetic force applied at the magnetic poles 43, 45 having the same polarity.

According to the present embodiment, the recession parts 42b and the protrusion parts 41b are arranged to cause the first ring 41 and the second ring 42 to be rotated relative to each other by the magnetic force caused at magnetic poles 43, 45 of the first magnetization belt 44 and the second magnetization belt 46 when the protrusion parts 41b are inserted into the recession parts 42b.

Thus, the repulsive force caused by the magnetic force applied to the magnetic poles 43, 45 causes the protrusion parts 41b to move toward the fixing part 42d, and the first ring 41 and the second ring 42 are rotated relative to each other. When the protrusion parts 41b becomes in contact with the fixing parts 42d, positions of the first ring 41 and the second ring 42 in the peripheral direction are fixed. Thus, it can be prevented that the positions of the first ring 41 and the second ring 42 becomes unstable, and an assembling work can be readily performed.

Second Embodiment

Hereafter, a second embodiment of the present disclosure will be described referring to FIGS. 15 to 20.

According to the first embodiment, the sensor magnet 12 is constituted by two rings that are the first ring 41 and the second ring 42. As the above configuration, the sensor magnet 12 is manufactured by processes including that establishes two rings, that magnetizes the two rings, that assembles the two rings, and that fixes the two rings. In this case, a workload of a manufacturing is relatively large.

Figure 18:
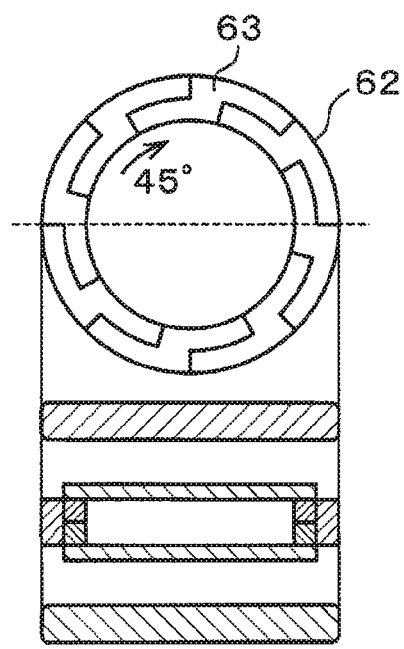
FIG. 18 is a schematic diagram showing the ring in a mask rotation process, according to the second embodiment.
Figure 19:
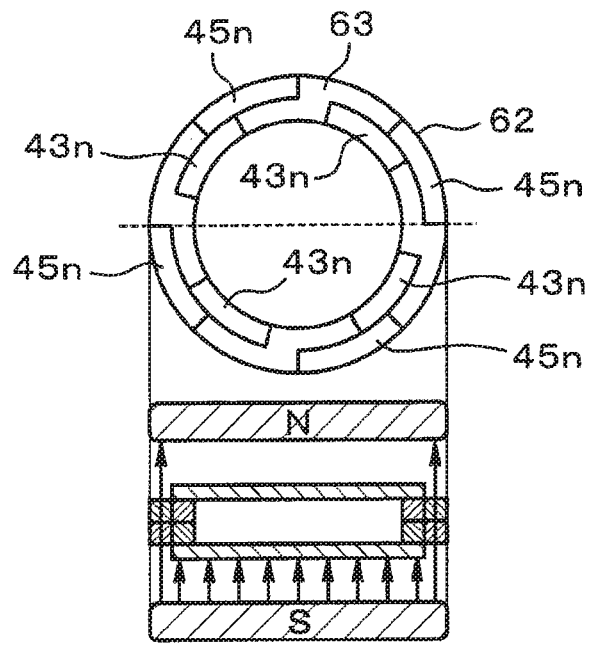
FIG. 19 is a schematic diagram showing the ring in a second magnetizing process, according to the second embodiment.
Figure 20:
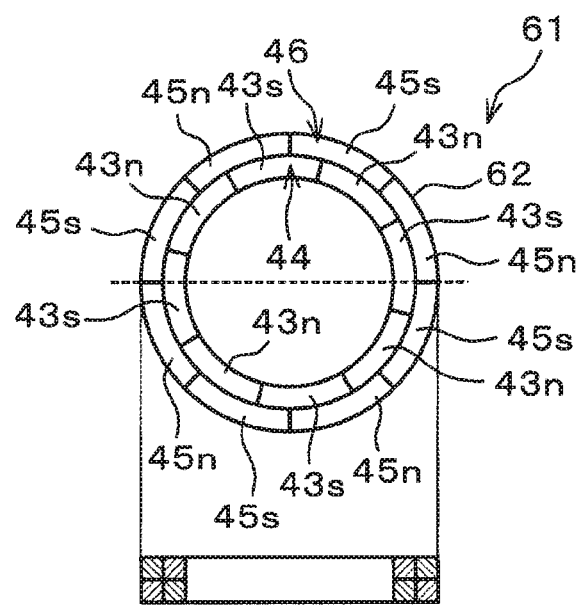
FIG. 20 is a schematic diagram showing the sensor magnet in a complete state, according to the second embodiment.

According to the present embodiment, as shown in FIG. 20, a sensor magnet 61 includes a ring 62 that is constituted by the first magnetization belt 44 and the second magnetization belt 46 by a pattern of a magnetization. In this case, the ring 62 is a single ring. Hereafter, a manufacturing process of the sensor magnet 61 will be described referring to FIGS. 15 to 20. As shown in FIGS. 15 to 20, upper parts that are regions upper than dashed lines show planar views of a surface of the circuit unit 31, and lower parts that are regions lower than the dashed lines show cross-sectional views of the ring 62.

Figure 15:
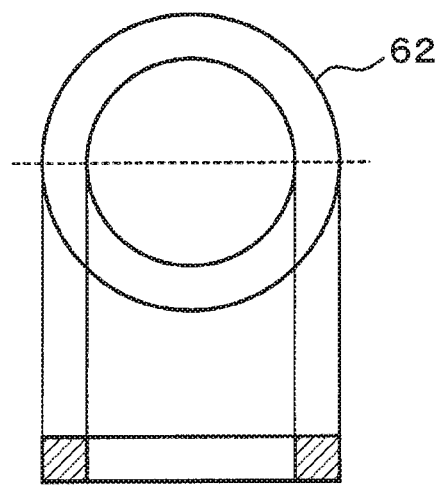
FIG. 15 is a schematic diagram showing a ring before being magnetized, according to a second embodiment of the present embodiment.
Figure 16:
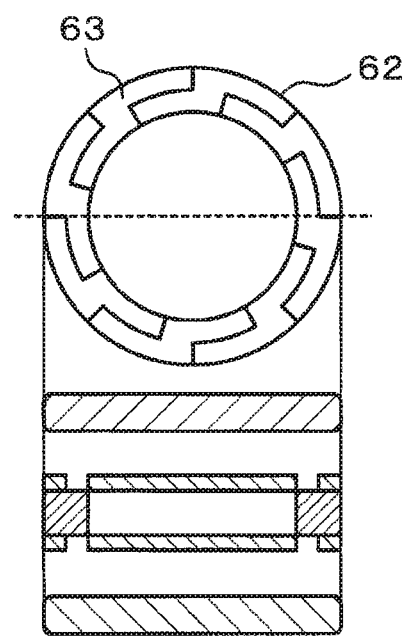
FIG. 16 is a schematic diagram showing the ring in a mask process, according to the second embodiment.

As shown in FIG. 15, the ring 62 used when the sensor magnet 61 is manufactured is shaped as the same as the first ring 41 and the second ring 42 that are assembled in the first embodiment. As shown in FIG. 16, magnetization masks 63 that are magnetic shields are disposed at an upper surface and a lower surface of the ring 62. Each of the magnetization masks 63 is shaped to cover a position at the upper surface of the ring 62 where the magnetic poles 43n of the first magnetization belt 44 and the magnetic poles 45n of the second magnetization belt 46 are located.

Figure 17:
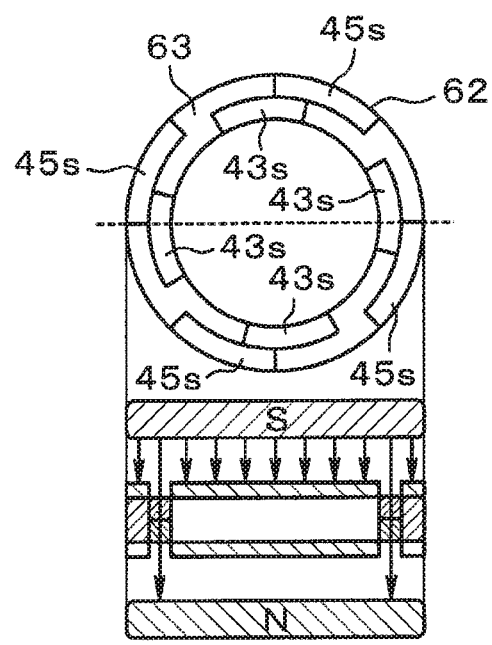
FIG. 17 is a schematic diagram showing the ring in a first magnetizing process, according to the second embodiment.

As shown in FIG. 17, a magnetic field where the upper surface of the ring 62 becomes an S-pole and the lower surface of the ring 62 becomes an N-pole is generated, and a first magnetization is executed. In the above magnetization, a general magnetization unit can be used. Thus, the magnetic poles 43s of the first magnetization belt 44 and the magnetic poles 45s of the second magnetization belt 46 are exposed at the upper surface of the ring 62. Then, the magnetization masks 63 are rotated by 45 degrees. Thus, as shown in FIG. 18, the magnetization masks 63 cover positions of the upper surface of the ring 62 where the magnetic poles 43s of the first magnetization belt 44 and the magnetic poles 45s of the second magnetization belt 46 are located.

As shown in FIG. 19, a magnetic field where the upper surface of the ring 62 becomes an N-pole and the lower surface of the ring 62 becomes an S-pole is generated, and a second magnetization is executed. Thus, the magnetic poles 43n of the first magnetization belt 44 and the magnetic poles 45n of the second magnetization belt 46 are exposed at the upper surface of the ring 62. By executing the above processes, as shown in FIG. 20, a product of the sensor magnet 61 including the ring 62 that is constituted by the first magnetization belt 44 and the second magnetization belt 46 by a pattern of a magnetization is completed.

According to the present embodiment, effects that are the same as effects in the first embodiment can be obtained. Further, according to the present embodiment, the sensor magnet 61 is constituted by the ring 62 that is constituted by the first magnetization belt 44 and the second magnetization belt 46 similar to the first magnetization belt 44 and the second magnetization belt 46 of the sensor magnet 12 in the first embodiment. Thus, when the sensor magnet 61 is manufactured, a process that assembles two rings in the first embodiment can be canceled. Thus, according to the present embodiment, a manufacturing of the sensor magnet 61 can be readily executed, and a workload of the manufacturing or a cost of the manufacturing can be decreased.

Third Embodiment

Hereafter, a third embodiment of the present disclosure will be described referring to FIGS. 21 to 29.

Figure 21:
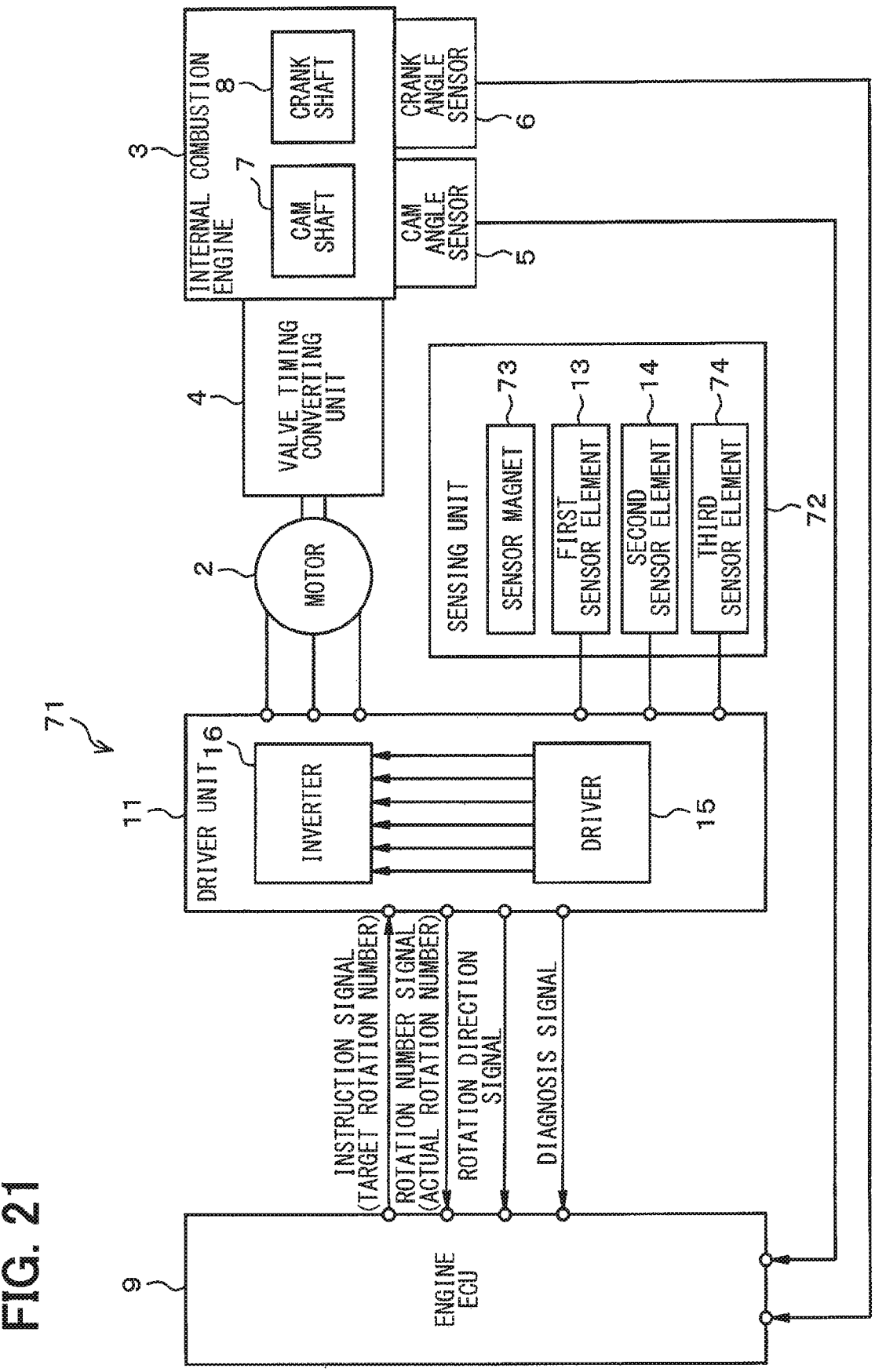
FIG. 21 is a schematic diagram showing the constitution of the motor control unit, according to a third embodiment of the present disclosure.

As shown in FIG. 21, according to the present embodiment, a sensing unit 72 of a motor control unit 71 is different from the sensing unit 10 in the first embodiment that the sensing unit 72 includes a sensor magnet 73 instead of the sensor magnet 12 and the sensing unit 72 further includes a third sensor element 74.

Similar to the first sensor element 13 and the second sensor element 14, the third sensor element 74 converts a periodical magnetic signal caused by a rotation of the sensor magnet 73 into a digital signal. An output signal of the third sensor element 74 is equivalent to the sensor signal corresponding to the rotation angle of the motor 2, and is transmitted to the driver unit 11.

Figure 22:
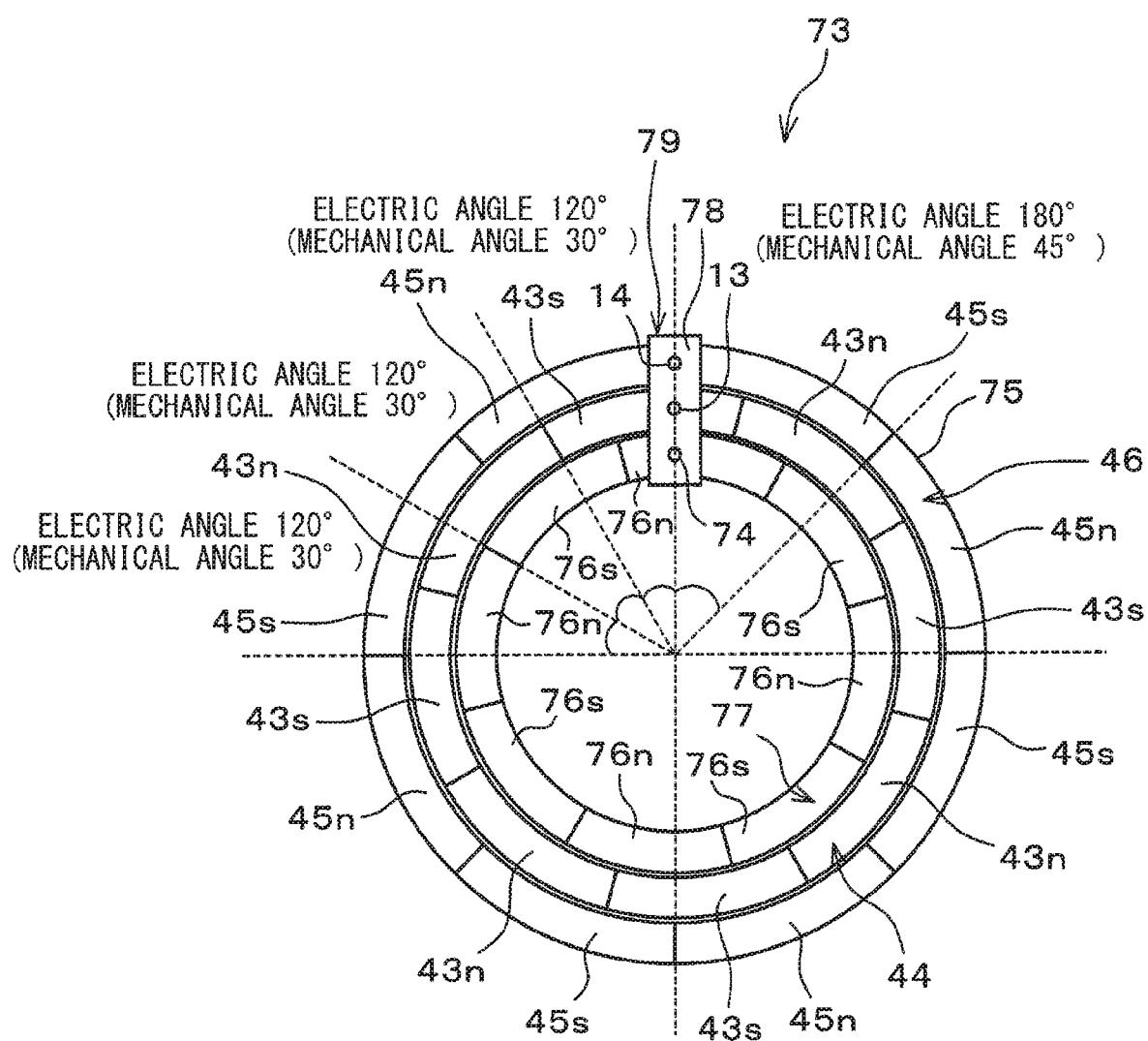
FIG. 22 is a schematic diagram showing the specific constitution of the sensing unit, according to the third embodiment.

As a specific constitution of the sensor magnet 73, a constitution shown in FIG. 22 can be used. In the constitution shown in FIG. 22, the sensor magnet 73 includes a ring 75 that is a single ring. The ring 75 includes the first magnetization belt 44, the second magnetization belt 46, and a third magnetization belt 77 that is a ring shape. The third magnetization belt 77 is constituted by magnetic poles 76n, 76s which are alternatively arranged in a peripheral direction of the ring 75. The magnetic poles 76n are N-poles, and the magnetic poles 76s are S-poles. Hereafter, when it is unnecessary to mention a polarity of a magnetic pole, the magnetic poles 76n, 76s are referred to as magnetic poles 76.

According to the present embodiment, a total number of the magnetic poles 76 of the third magnetization belt 77 is eight. The first magnetization belt 44, the second magnetization belt 46 and the third magnetization belt 77 are concentrically disposed to cause arrangements of the magnetic poles 43, 45 and 76 to be shifted from each other by a predetermined angle in a peripheral direction of the first magnetization belt 44 or the second magnetization belt 46 or the third magnetization belt 77. In this case, the second magnetization belt 46 is located at a position outermost of the sensor magnet 73 in the radial direction, and the third magnetization belt 77 is located at a position innermost of the sensor magnet 73 in the radial direction. According to the present embodiment, the predetermined angle is 120 degrees that is an electric angle, and is 30 degrees that is a mechanical angle.

The first sensor element 13, the second sensor element 14 and the third sensor element 74 are arranged in the radial direction of the rotor 28. In this case, the second sensor element 14 is located at a position outermost among the sensor elements 13, 14 and 74 in the radial direction, and the third sensor element 74 is located at a position innermost among the sensor elements 13, 14 and 74 in the radial direction. The first sensor element 13, the second sensor element 14 and the third sensor element 74 are Hall elements and are constituted by a semiconductor integrated circuit 79 housed in a single package 78. Hereafter, the semiconductor integrated circuit 79 is referred to as a sensor IC 79.

Figure 23:
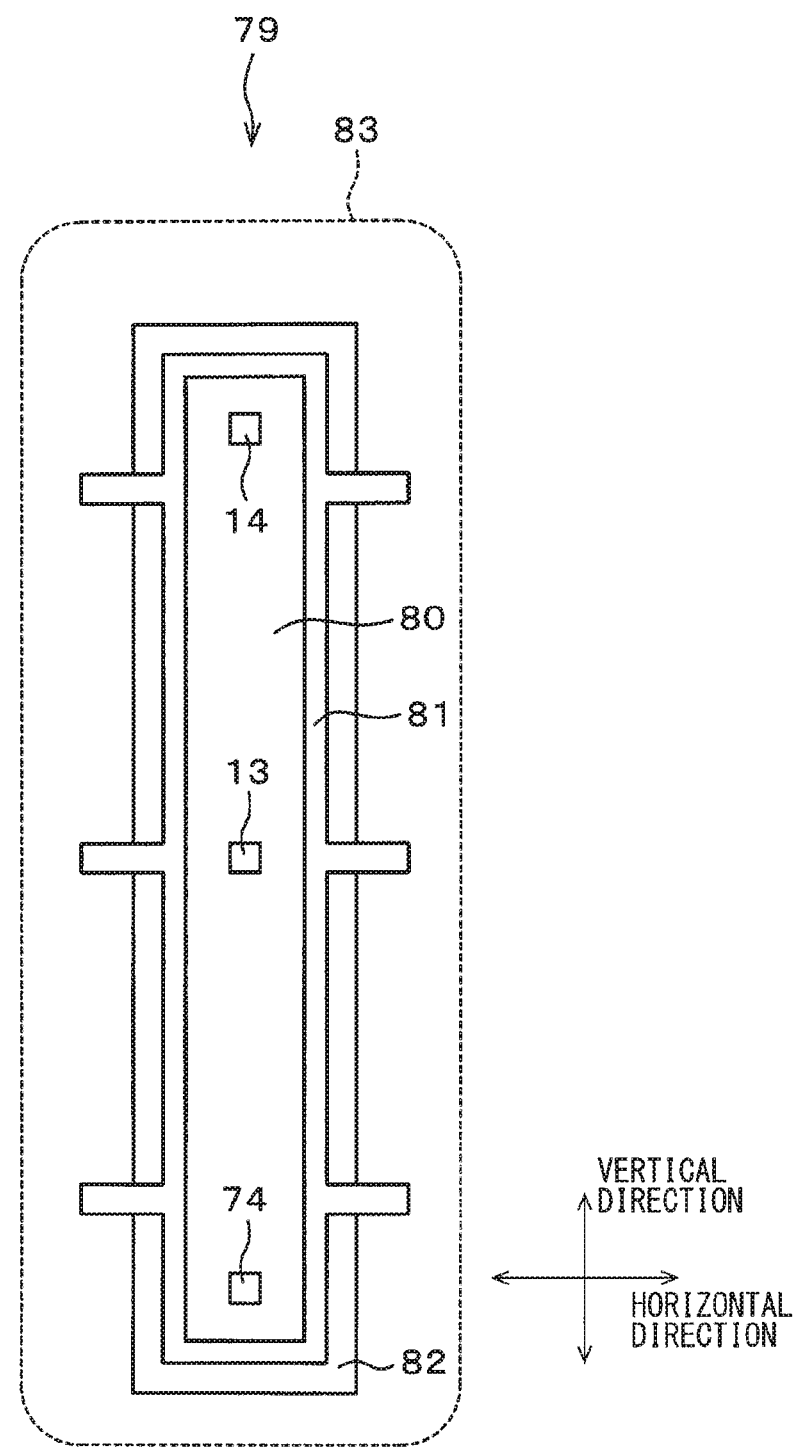
FIG. 23 is a schematic diagram showing the specific constitution of the sensor IC, according to the third embodiment.

As a specific constitution of the sensor IC 79, a constitution shown in FIG. 23 can be used. As shown in FIG. 23, the sensor IC 79 includes a sensor chip 80 on which the first sensor element 13, the second sensor element 14 and the third sensor element 74 are mounted, a lead frame 81 that supports the sensor chip 80 and is connected with an external wiring, and a resin mold 82 that seals the sensor chip 80.

According to the constitution shown in FIG. 23, the first sensor element 13, the second sensor element 14 and the third sensor element 74 have a dimension in a horizontal direction that is 0.3 mm and a dimension in a vertical direction that is 0.3 mm. The sensor chip 80 has a dimension in the horizontal direction that is 1 mm and a dimension in the vertical direction that is 9.3 mm. The lead frame 81 has a dimension in the horizontal direction that is 1.4 mm and a dimension in the vertical direction that is 9.7 mm. The resin mold 82 has a dimension in the horizontal direction that is 2.4 mm and a dimension in the vertical direction that is 10.7 mm.

When the sensor IC 79 is mounted to the circuit substrate 34, the circuit substrate 34 includes a substrate exclusive-possession part 83 where the sensor IC 79 is located. The substrate exclusive-possession part 83 has a dimension in the horizontal direction that is 5.4 mm and a dimension in the vertical direction that is 13.7 mm. The substrate exclusive-possession part 83 is equivalent to a region where the sensor IC 79 is located. Thus, an area of the substrate exclusive-possession part 83 of the sensor IC 79 is 73.98 $mm^2$.

Figure 24:
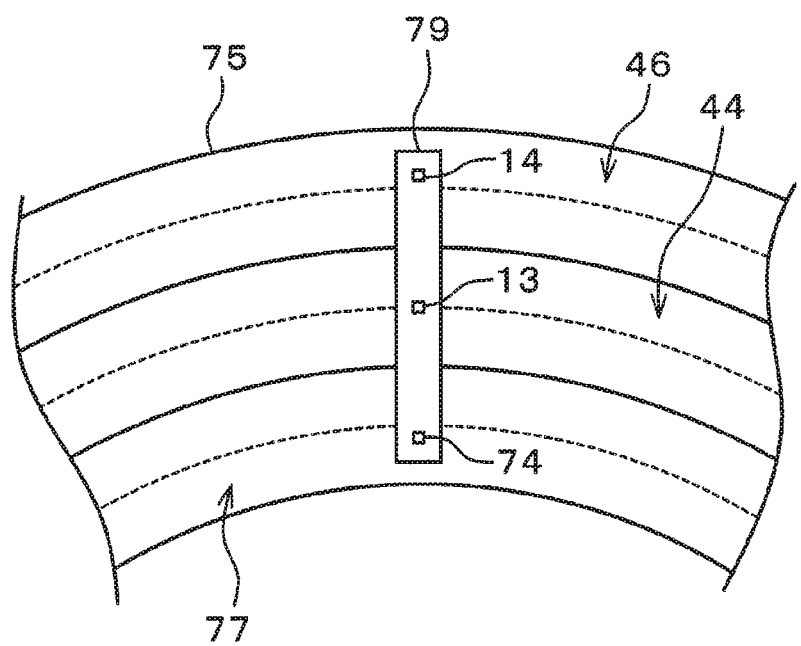
FIG. 24 is a diagram showing the specific arrangement position of the sensor IC, according to the third embodiment.

The sensor IC 79 is disposed as shown in FIG. 24. The first sensor element 13 is located at a position to face the first magnetization belt 44 and is substantially located at a center of the first magnetization belt 44 in the radial direction of the first magnetization belt 44. The second sensor element 14 is located at a position to face the second magnetization belt 46 and is located outward of the center of the second magnetization belt 46 in the radial direction of the second magnetization belt 46 and is located outward of the center of the second magnetization belt 46 in a radial direction of the second magnetization belt 46. The third sensor element 74 is located at a position to face the third magnetization belt 77 and is located outward of a center of the third magnetization belt 77 in a radial direction of the third magnetization belt 77 and is located inward of a center of the third magnetization belt 77 in a radial direction of the third magnetization belt 77.

According to the present embodiment, since the sensor magnet 73 includes the ring 75 that is constituted by the first magnetization belt 44, the second magnetization belt 46 and the third magnetization belt 77 by a pattern of a magnetization, the sensor magnet 73 can be manufactured by processes at the same as the sensor magnet 61 in the second embodiment.

Figure 25:
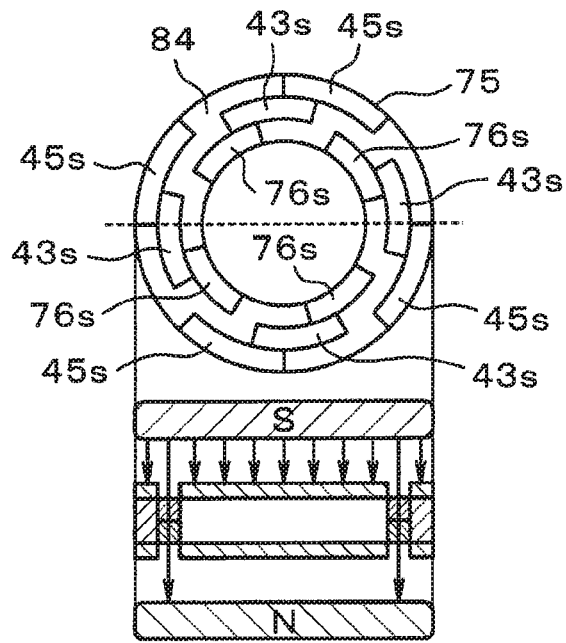
FIG. 25 is a schematic diagram showing the ring in the first magnetizing process, according to the third embodiment.

As shown in FIG. 25, magnetization masks 84 that are magnetic shields are disposed at an upper surface and a lower surface of the ring 75. Each of the magnetization masks 84 is shaped to cover a position at the upper surface of the ring 75 where the magnetic poles 43n of the first magnetization belt 44, the magnetic poles 45n of the second magnetization belt 46 and the magnetic poles 76n of the third magnetization belt 77 are located.

When the magnetization masks 84 are arranged as the above description, a magnetic field where the upper surface of the ring 75 becomes an S-pole and the lower surface of the ring 75 becomes an N-pole is generated, and the first magnetization is executed. In the above magnetization, a general magnetization unit can be used. Thus, the magnetic poles 43s of the first magnetization belt 44, the magnetic poles 45s of the second magnetization belt 46 and the magnetic poles 76s of the third magnetization belt 77 are exposed at the upper surface of the ring 75.

Figure 26:
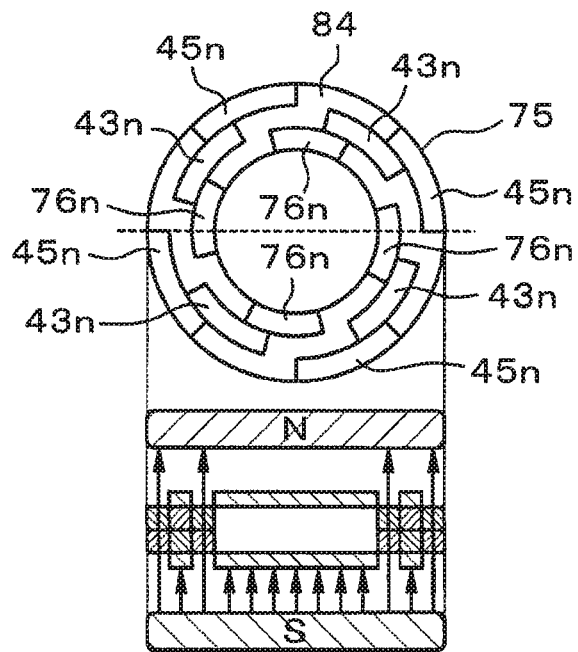
FIG. 26 is a schematic diagram showing the ring in the second magnetizing process, according to the third embodiment.

Then, the magnetization masks 84 are rotated by 45 degrees. Thus, as shown in FIG. 26, the magnetization masks 84 cover positions of the upper surface of the ring 75 where the magnetic poles 43s of the first magnetization belt 44, the magnetic poles 45s of the second magnetization belt 46 and the magnetic poles 76s of the third magnetization belt 77 are located. When the magnetization masks 84 are arranged as the above description, a magnetic field where the upper surface of the ring 75 becomes an N-pole and the lower surface of the ring 75 becomes an S-pole is generated, and the second magnetization is executed.

Figure 27:
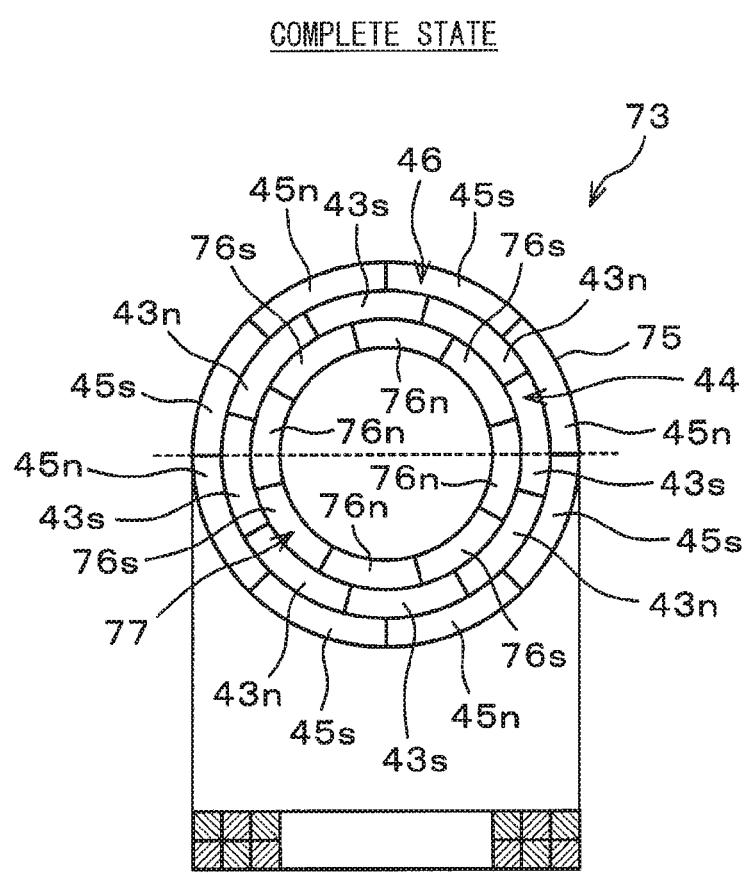
FIG. 27 is a schematic diagram showing the sensor magnet in the complete state, according to the third embodiment.

Thus, the magnetic poles 43n of the first magnetization belt 44, the magnetic poles 45n of the second magnetization belt 46 and the magnetic poles 76n of the third magnetization belt 77 are exposed at the upper surface of the ring 75. By executing the above processes, as shown in FIG. 27, a product of the sensor magnet 73 including the ring 75 that is constituted by the first magnetization belt 44, the second magnetization belt 46 and the third magnetization belt 77 by a pattern of a magnetization is completed.

Figure 28:
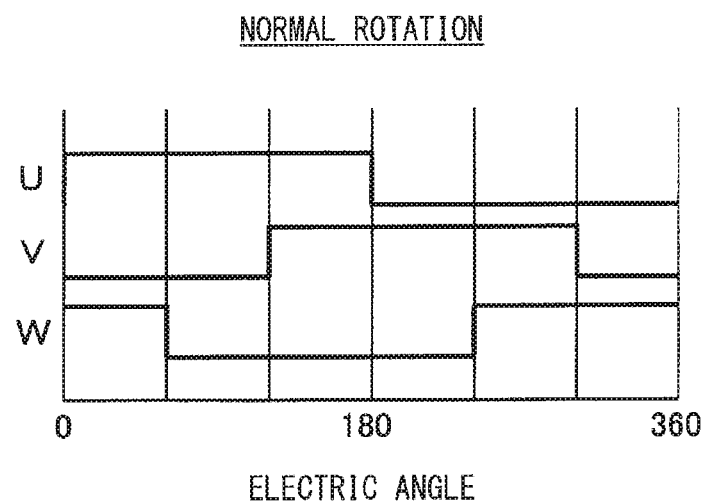
FIG. 28 is a schematic diagram showing the sensor signal in the normal rotation, according to the third embodiment.
Figure 29:
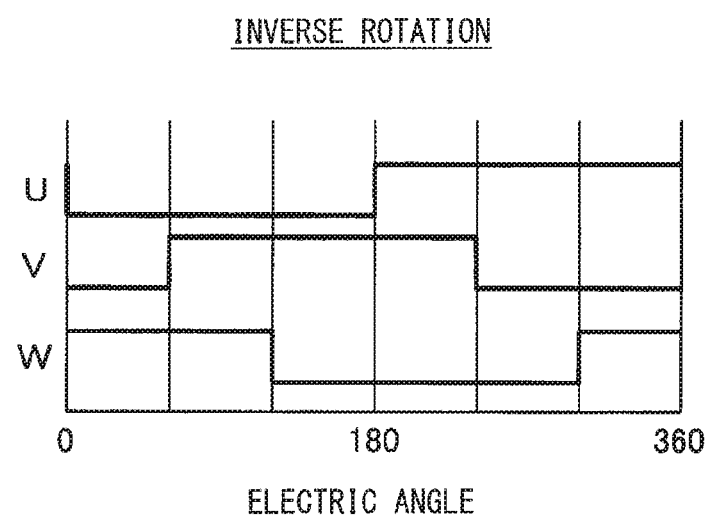
FIG. 29 is a schematic diagram showing the sensor signal in the inverse rotation, according to the third embodiment.

According to the above description, as shown in FIGS. 28 and 29, the sensor signal output from the first sensor element 13, the second sensor element 14 and the third sensor element 74 are signals as the same as those in a conventional configuration where three sensor elements are arranged to cause the three sensor elements to be different from each other by 120 degrees in electric angles. FIG. 28 shows the sensor signals in a normal rotation where the motor 2 rotates in the first direction, and FIG. 29 shows the sensor signals in an inverse rotation where the motor 2 rotates in the second direction that is opposite to the first direction. As shown in FIGS. 28 and 29, solid lines indicate the sensor signals output from the first sensor element 13, the second sensor element 14 and the third sensor element 74. Thus, according to the above description, the rotation angle of the motor 2 can be detected with a high precision even by using a general detection, as the same as a conventional configuration where the three sensor elements are arranged to cause the three sensor elements to be different from each other by 120 degrees in electric angles.

According to the present embodiment, effects that are the same as effects in the first embodiment can be obtained. According to the present embodiment, an occupation area of the sensor IC 79 relative to the circuit substrate 34 becomes larger by a value corresponding to the three sensor elements that are the first sensor element 13, the second sensor element 14 and the third sensor element 74. However, according to the present embodiment, it is unnecessary to execute a time measurement when the rotation angle of the motor 2 is detected as the first embodiment, and a processing load in the motor control unit 71 can be reduced by a value corresponding to the time measurement.

According to the present embodiment, the sensor IC 79 is disposed to cause the second sensor element 14 to be located outward of the center of the second magnetization belt 46 in the radial direction of the second magnetization belt 46 and the third sensor element 74 is located inward of the center of the third magnetization belt 77 in the radial direction of the third magnetization belt 77. In this case, the first sensor element 13 has to substantially located at the center of the first magnetization belt 44 in the radial direction of the first magnetization belt 44. It is preferable that a width dimension of the first magnetization belt 44 in the radial direction of the first magnetization belt 44 is set to be as large as possible. Then, the first sensor element 13, the second sensor element 14 and the third sensor element 74 are not disposed at positions in the sensor magnet 73 to face positions where the magnetic force in the Z-axis direction is relatively small, and the occurrence of the erroneous detection of the rotation angle of the motor 2 can be prevented.

OTHER EMBODIMENT

The present disclosure is not limited to the embodiments mentioned above, and can be applied to various embodiments within the spirit and scope of the present disclosure. For example, the present disclosure can be modified or arranged as followings.

The values in the above embodiments are examples, and the present disclosure is not limited to the values.

The motor that is controlled by the motor control units 1 and 71 is not limited to the motor 2 of the inner rotor type and may be a motor of an outer rotor type.

The first sensor element 13 and the second sensor element 14 in the first embodiment and the second embodiment are not limited to the semiconductor integrated circuit 48 and may be constituted as discrete components. The first sensor element 13, the second sensor element 14 and the third sensor element 74 in the third embodiment also are not limited to the semiconductor integrated circuit 79 and may be constituted as discrete components.

The sensor magnet 73 of the third embodiment may include three rings that are a ring constituted by the first magnetization belt 44, a ring constituted by the second magnetization belt 46 and a ring constituted by the third magnetization belt 77.

The specific constitutions of the first ring 41 and the second ring 42 can be appropriately changed. For example, recession parts that are the same as the recession parts 42b are disposed at the side surface part 41a of the first ring 41, and protrusion parts that are the same as the protrusion parts 41b are disposed at the side surface part 42a of the second ring 42. According to the above constitution, the first ring 41 and the second ring 42 can be assembled by a technology in the first embodiment.

Arrangements of the first sensor element 13, the second sensor element 14 and the third sensor element 74 can be appropriately changed as long as the first sensor element 13, the second sensor element 14 and the third sensor element 74 are located at positions where the first sensor element 13, the second sensor element 14 and the third sensor element 74 can receive the magnetic force in the Z-axis direction which is generated by the sensor magnets 12, 61 and 73.

The present disclosure has been described with reference to the examples, but the present disclosure is not limited to the examples or the structures. The present disclosure includes various modification examples and modifications within the same range. In addition, while the various combinations and configurations, which are preferred, other combinations and configurations, including more, less or only a single element, are also within the spirit and scope of the present disclosure.

What is claimed is:

1. A motor control unit that controls a motor, comprising:
a sensing unit including a sensor magnet configured to rotate in synchronization with a rotation of a rotor included in the motor, and a first sensor element and a second sensor element configured to convert a periodical magnetic signal caused by a rotation of the sensor magnet into a digital signal; and
a driver unit configured to control the motor based on output signals of the first sensor element and the second sensor element, wherein:
the sensor magnet includes a first magnetization belt and a second magnetization belt where a plurality of magnetic poles is arranged in a peripheral direction of the rotor, the first magnetization belt and the second magnetization belt being a ring shape, the first magnetization belt and the second magnetization belt are concentrically disposed to cause arrangements of the magnetic poles to be shifted from each other by a predetermined angle in a peripheral direction of the first magnetization belt or the second magnetization belt, the first sensor element and the second sensor element are arranged in a radial direction of the rotor, the sensor magnet includes a first ring where the first magnetization belt is located, and a second ring where the second magnetization belt is located, the first ring includes a first side surface part that is in contact with the second ring, and a protrusion part that is located at the first side surface part, the second ring includes a second side surface part that is in contact with the first ring, and a recession part that is located at the second side surface part and is configured to receive the protrusion part, when the protrusion part is inserted into the recession part, the first ring and the second ring are assembled, and the first magnetization belt and the second magnetization belt are concentrically disposed, the recession part has a length in a peripheral direction of the recession part that is longer than a length of the protrusion part in a peripheral direction of the protrusion part, and the recession part and the protrusion part are arranged to cause the first ring and the second ring to be rotated relative to each other by a magnetic force caused at the magnetic poles of the first magnetization belt and the second magnetization belt when the protrusion part is inserted into the recession part.

2. The motor control unit according to claim 1, wherein the first sensor element and the second sensor element are constituted by a semiconductor integrated circuit housed in a single package.

3. A motor control unit that controls a motor, comprising:
a sensing unit including a sensor magnet configured to rotate in synchronization with a rotation of a rotor included in the motor, and a first sensor element and a second sensor element configured to convert a periodical magnetic signal caused by a rotation of the sensor magnet into a digital signal; and
a driver unit configured to control the motor based on output signals of the first sensor element and the second sensor element, wherein:
the sensor magnet includes a first magnetization belt and a second magnetization belt where a plurality of magnetic poles is arranged in a peripheral direction of the rotor, the first magnetization belt and the second magnetization belt being a ring shape,
the first magnetization belt and the second magnetization belt are concentrically disposed to cause arrangements of the magnetic poles to be shifted from each other by a predetermined angle in a peripheral direction of the first magnetization belt or the second magnetization belt,
the first sensor element and the second sensor element are arranged in a radial direction of the rotor,
the driver unit is to measure a time when a level of the output signal of the first sensor element and a level of the output signal of the second sensor element are identical to each other, and
the driver unit is to estimate a rotation angle of the motor based on a measured time, the level of the output signal of the first sensor element and the level of the output signal of the second sensor element.

4. The motor control unit according to claim 3, wherein the first sensor element and the second sensor element are constituted by a semiconductor integrated circuit housed in a single package.

5. A motor control unit that controls a motor, comprising:
a sensing unit including a sensor magnet configured to rotate in synchronization with a rotation of a rotor included in the motor, and a first sensor element and a second sensor element configured to convert a periodical magnetic signal caused by a rotation of the sensor magnet into a digital signal; and
a driver unit configured to control the motor based on output signals of the first sensor element and the second sensor element, wherein:
the sensor magnet includes a first magnetization belt and a second magnetization belt where a plurality of magnetic poles is arranged in a peripheral direction of the rotor, the first magnetization belt and the second magnetization belt being a ring shape,
the first magnetization belt and the second magnetization belt are concentrically disposed to cause arrangements of the magnetic poles to be shifted from each other by a predetermined angle in a peripheral direction of the first magnetization belt or the second magnetization belt,
the first sensor element and the second sensor element are arranged in a radial direction of the rotor,
the sensing unit further includes a third sensor element configured to convert a periodical magnetic signal caused by the rotation of the sensor magnet into a digital signal,
the driver unit is to control the motor based on output signals of the first sensor element, the second sensor element and the third sensor element,
the sensor magnet further includes a third magnetization belt where a plurality of magnetic poles is arranged in the peripheral direction of the rotor, the third magnetization belt being a ring shape,
the first magnetization belt, the second magnetization belt and the third magnetization belt are concentrically disposed to cause arrangements of the magnetic poles to be shifted from each other by the predetermined angle in a peripheral direction of the first magnetization belt, the second magnetization belt or the third magnetization belt, and
the first sensor element, the second sensor element and the third sensor element are arranged in the radial direction of the rotor.

6. The motor control unit according to claim 5, wherein the first sensor element, the second sensor element and the third sensor element are constituted by a semiconductor integrated circuit housed in a single package.

7. The motor control unit according to claim 5, wherein the sensor magnet includes a single ring that is constituted by the first magnetization belt, the second magnetization belt and the third magnetization belt by a pattern of a magnetization.

* * * * *